(12) United States Patent
Fox et al.

(10) Patent No.: US 12,229,203 B2
(45) Date of Patent: Feb. 18, 2025

(54) AUTOMATICALLY SUGGESTING SOCIAL MEDIA MESSAGES INCLUDING INTERNET OF THINGS (IOT) DEVICE DATA

(71) Applicant: INTERNATIONAL BUSINESS MACHINES CORPORATION, Armonk, NY (US)

(72) Inventors: Jeremy R. Fox, Georgetown, TX (US); Kelley Anders, East New Market, MD (US); Lisa Seacat DeLuca, Baltimore, MD (US); Jeremy A. Greenberger, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1808 days.

(21) Appl. No.: 16/204,533

(22) Filed: Nov. 29, 2018

(65) Prior Publication Data
US 2020/0175083 A1 Jun. 4, 2020

(51) Int. Cl.
*G06F 16/9535* (2019.01)
*G06F 16/9538* (2019.01)

(52) U.S. Cl.
CPC ...... *G06F 16/9535* (2019.01); *G06F 16/9538* (2019.01)

(58) Field of Classification Search
CPC ............. G06F 16/9535; G06F 16/9538; G06F 16/9536
See application file for complete search history.

(56) References Cited

U.S. PATENT DOCUMENTS

| | | |
|---|---|---|
| 8,180,591 B2 | 5/2012 | Yuen et al. |
| 2015/0019342 A1 | 1/2015 | Gupta |
| 2015/0019714 A1 | 1/2015 | Shaashua et al. |
| 2015/0127737 A1 | 5/2015 | Thompson et al. |
| 2016/0179962 A1* | 6/2016 | Patten .................. H04L 67/12 707/706 |
| 2017/0129426 A1* | 5/2017 | Smith ................... B60K 35/00 |
| 2017/0231490 A1 | 8/2017 | Toth et al. |
| 2018/0025656 A1* | 1/2018 | Cronin .............. G06Q 10/1093 434/236 |
| 2018/0183874 A1* | 6/2018 | Cook .................. H04L 41/0816 |
| 2019/0103111 A1* | 4/2019 | Tiwari .................... G10L 15/22 |
| 2020/0026632 A1* | 1/2020 | Brinkmann ............ G06N 20/20 |
| 2020/0192630 A1* | 6/2020 | Schairer .................. H04L 51/02 |

OTHER PUBLICATIONS

Mell et al., "The NIST Definition of Cloud Computing", NIST, Special Publication 800-145, Sep. 2011, 7 pages.
(Continued)

*Primary Examiner* — Maher N Algibhah
(74) *Attorney, Agent, or Firm* — Michael O'Keefe; Andrew D. Wright; Calderon Safran & Wright P.C.

(57) ABSTRACT

A computer-implemented method includes: receiving, by a computer device and from a user device, a draft social media message; determining, by the computer device and based on the receiving, data of an Internet of Things (IoT) device that is related to the draft social media message; generating, by the computer device and based on the determining, a suggested social media message that includes the data of the IoT device; and transmitting, by the computer device, the suggested social media message to the user device.

18 Claims, 9 Drawing Sheets

(56) References Cited

OTHER PUBLICATIONS

Fitbit Staff, "Share Your Workout With Fitbit!" https://blog.fitbit.com/try-the-new-exercise-sharing-tool-from-fitbit, Aug. 31, 2015, 2 pages.
Facebook, "Fitbit & Facebook—Share Stats with your Friends", https://www.facebook.com/notes/fitbit/fitbit-facebook-share-stats-with-your-friends/136043843090819/, Jul. 1, 2010, 1 page.
Swan, "Sensor Mania! The Internet of Things, Wearable Computing, Objective Metrics, and the Quantified Self 2.0." J. Sens. Actuator Netw. 2012, 37 pages.
Kranz, "Things That Twitter: Social Networks and the Internet of Things", 2010, 10 pages.
Atzori, "The Social Internet of Things (SIoT)—When Social Networks meet the Internet of Things: Concept, Architecture and Network Characterization", http://www.sciencedirect.com/science/article/pii/S1389128612002654, Computer Networks, vol. 56, Issue 16, Nov. 14, 2012, 38 pages.
IBM Watson, "https://www.ibm.com/watson/services/discovery.html", accessed Nov. 20, 2018, 7 pages.

\* cited by examiner

AUTOMATICALLY SUGGESTING SOCIAL MEDIA MESSAGES INCLUDING INTERNET OF THINGS (IOT) DEVICE DATA

BACKGROUND

The present invention relates generally to computer based messaging and, more particularly, to automatically suggesting social media messages including Internet of Things (IoT) device data.

Internet of Things (IoT) devices are generally understood to be nonstandard (i.e., special purpose) computing devices that connect wirelessly to a network and that transmit data. Some IoT devices have been configured to publish data to subscribers. One such mechanism for publishing IoT device data is through the use of If This Then That (IFTTT), which is a web-based service to create chains of simple conditional statements, called applets.

SUMMARY

In a first aspect of the invention, there is a computer-implemented method including: receiving, by a computer device and from a user device, a draft social media message; determining, by the computer device and based on the receiving, data of an Internet of Things (IoT) device that is related to the draft social media message; generating, by the computer device and based on the determining, a suggested social media message that includes the data of the IoT device; and transmitting, by the computer device, the suggested social media message to the user device.

In another aspect of the invention, there is a computer program product including a computer readable storage medium having program instructions embodied therewith. The program instructions are executable by a computing device to cause the computer device to: receiving a draft social media message from a user device; determine data of an Internet of Things (IoT) device that is related to the draft social media message; determine a sentiment of the message is a negative sentiment; and based on the determining the negative sentiment, perform one of: generate and transmit to the user device a suggested social media message that includes both the data of the IoT device and an alert of the determined negative sentiment; and determine that the determined negative sentiment satisfies a rule that prohibits generating a suggested social media message that includes the data of the IoT device.

In another aspect of the invention, there is system including a processor, a computer readable memory, and a computer readable storage medium. The system includes: program instructions to receive data from an Internet of Things (IoT) device that is registered with a user; program instructions to generate a suggested social media message that includes the data from the IoT device; and program instructions to transmit the suggested social media message to a user device for display via a user interface of a social media application. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

[Col. 2]

Figure 1:
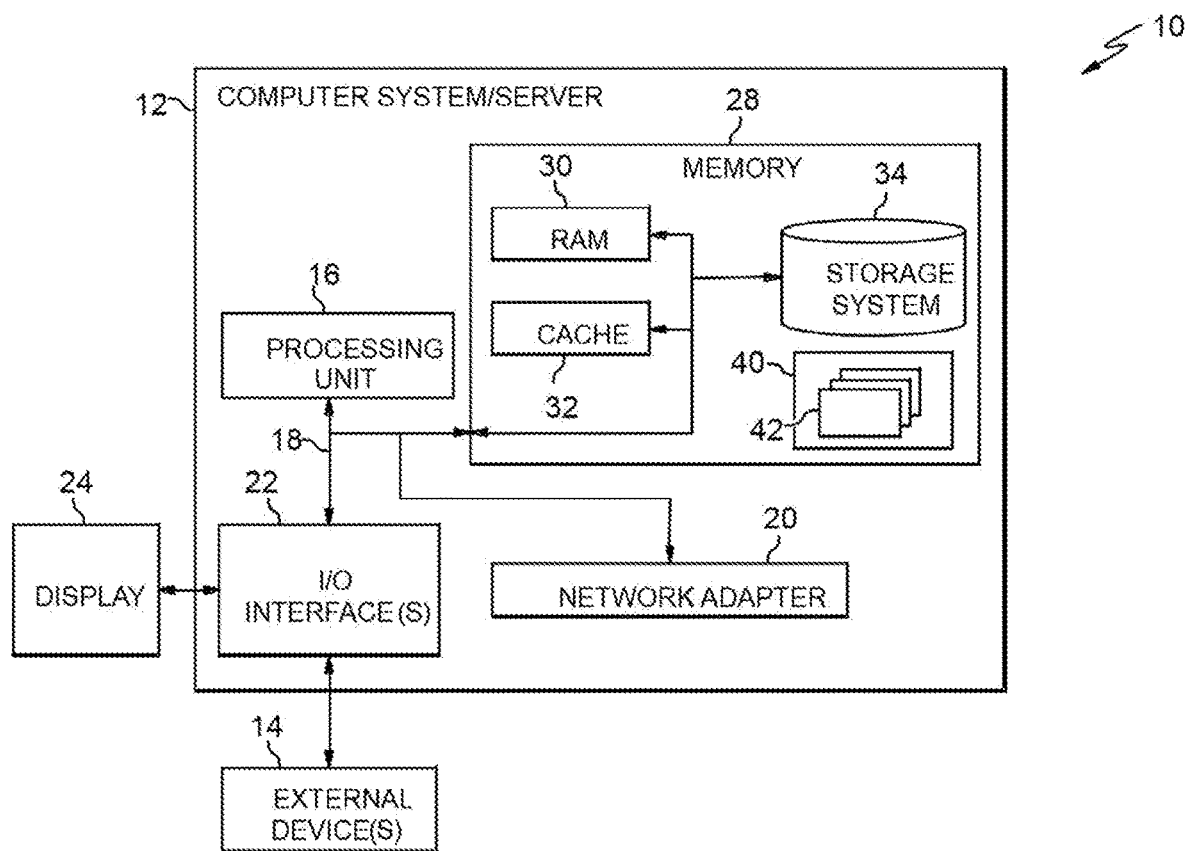

FIG. 1 depicts a cloud computing node according to an embodiment of the present invention.

Figure 2:
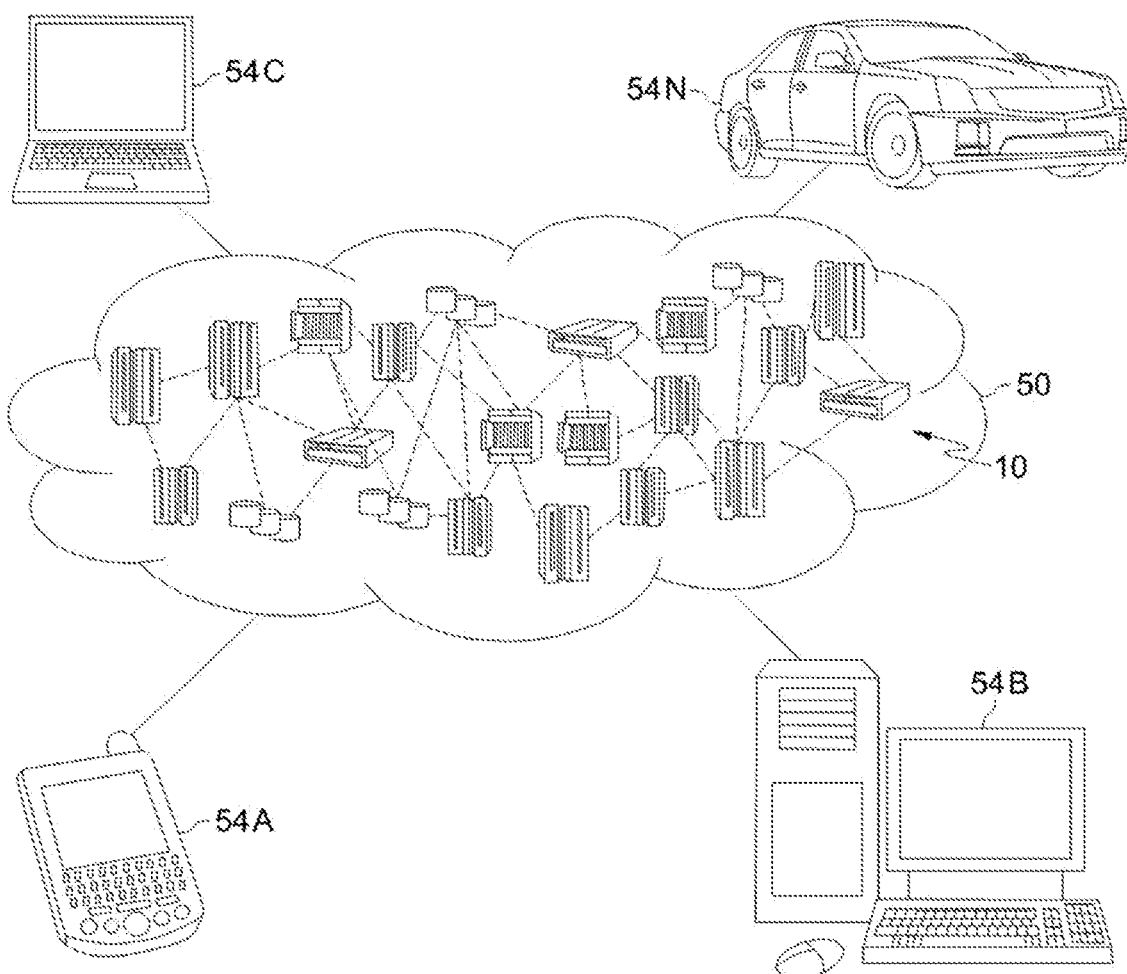

FIG. 2 depicts a cloud computing environment according to an embodiment of the present invention.

Figure 3:
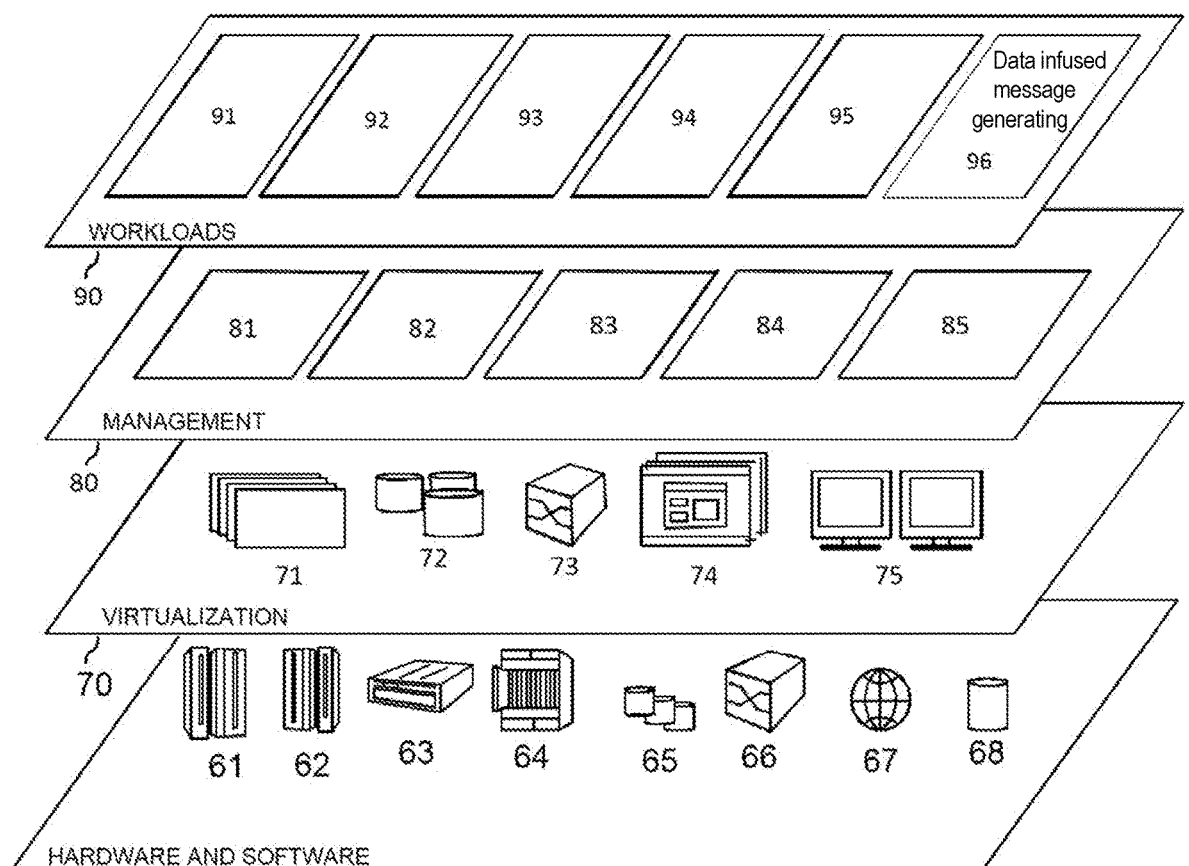

FIG. 3 depicts abstraction model layers according to an embodiment of the present invention.

Figure 4:
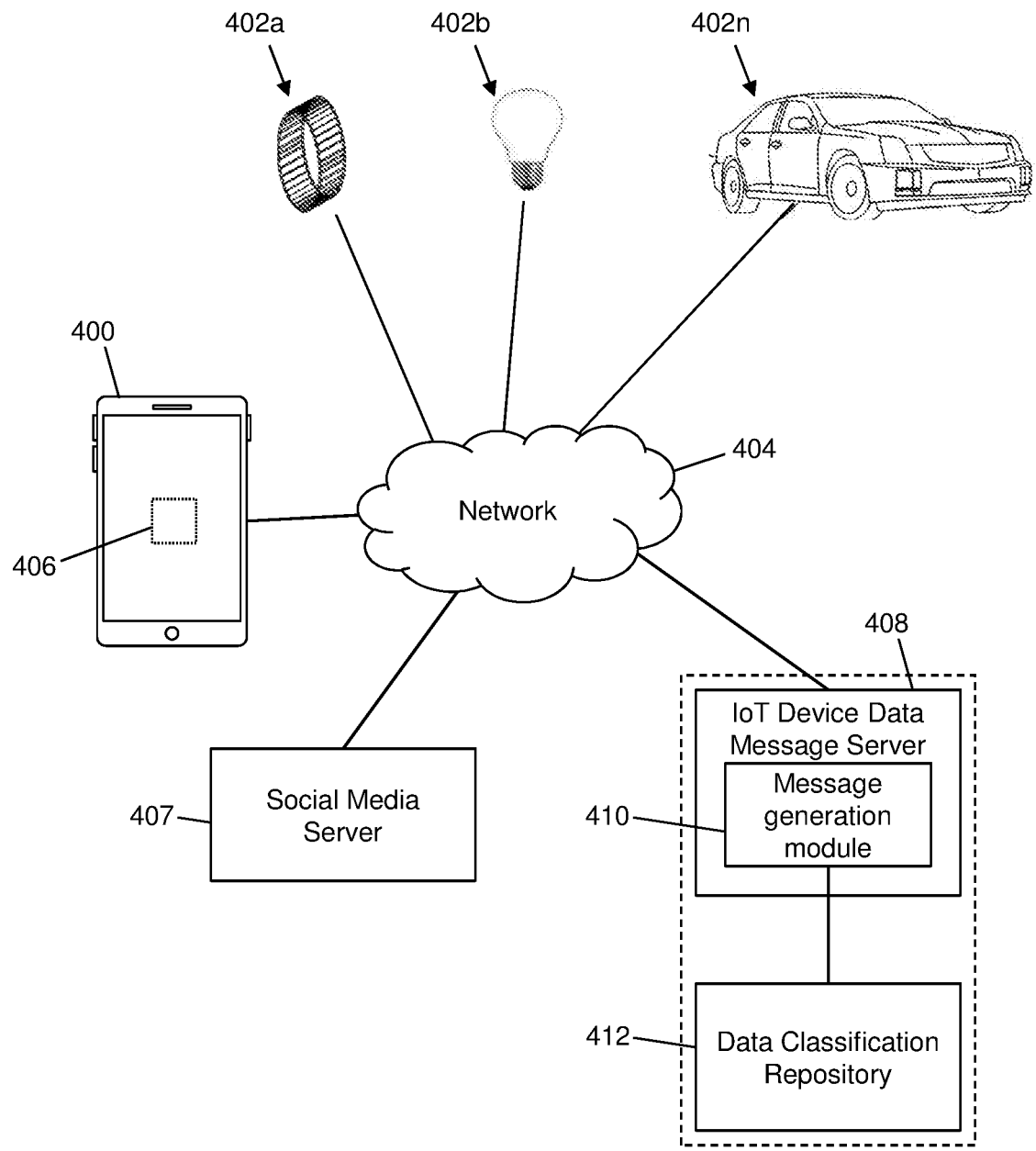

FIG. 4 shows a block diagram of an exemplary environment in accordance with aspects of the invention.

FIGS. 5A-B, 6A-C, and 7A-B show exemplary use cases in accordance with aspects of the invention.

Figure 8:
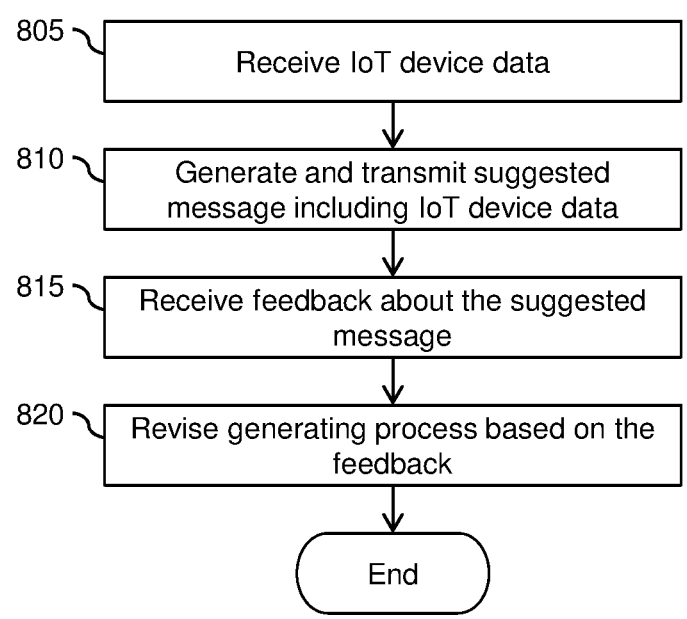
Figure 9:
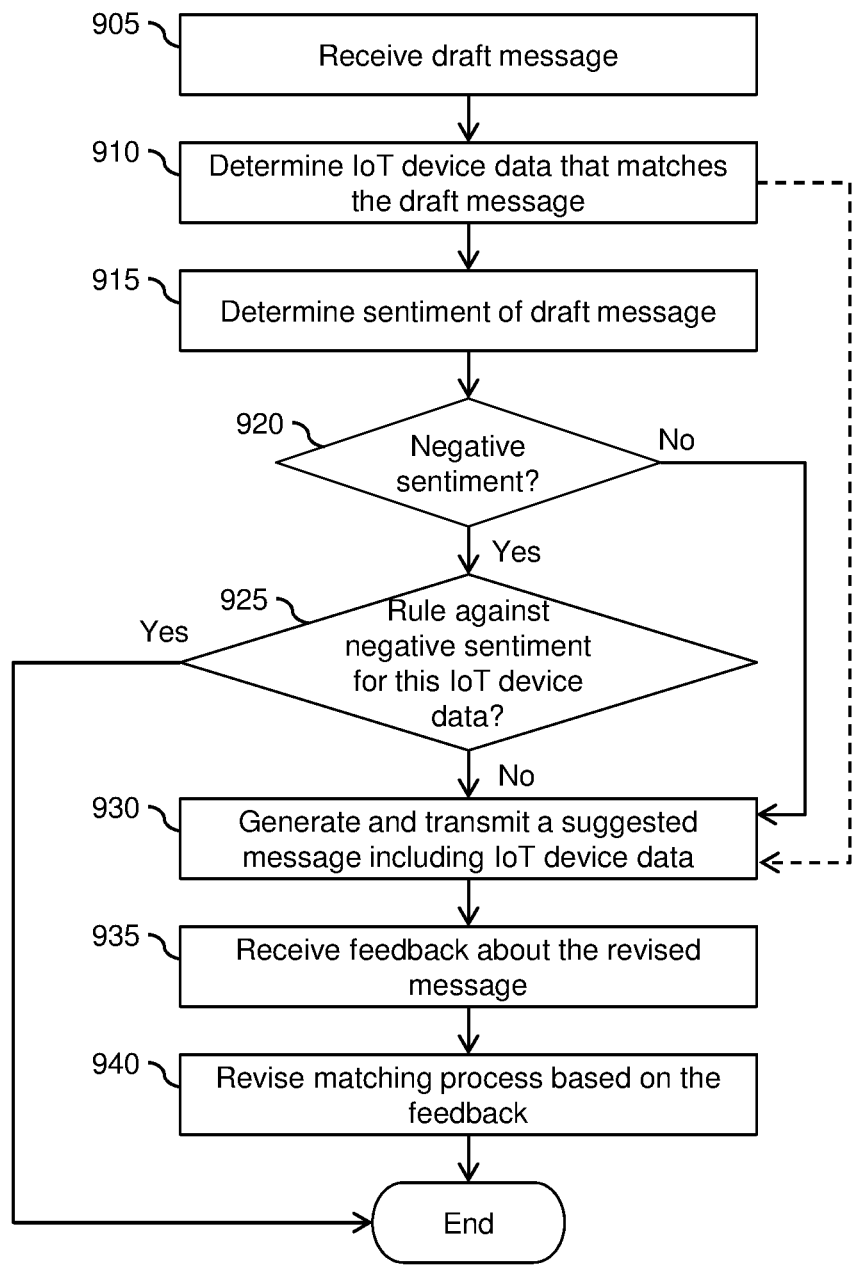

FIGS. 8 and 9 show flowcharts of exemplary methods in accordance with aspects of the invention.

DETAILED DESCRIPTION

The present invention relates generally to computer based messaging and, more particularly, to automatically suggesting social media messages including Internet of Things (IoT) device data. According to aspects of the invention, a system and method are configured to automatically suggest a social media message to a user, where the suggested social media message includes data from an IoT device registered with the user. In an embodiment, the system detects that the user has provided an instruction to a particular IoT device and, based on the detecting, the system automatically generates a suggested social media message that includes data obtained from the particular IoT device. In another embodiment, the system receives a draft social media message from the user, determines data from an IoT device related to the content of the draft social media message, and generates a revised social media message that includes the determined data from the IoT device. In this manner, implementations of the invention automatically integrate social media messaging and IoT device data for a user.

Aspects of the invention mix social media based tooling with the formal use of IoT to determine what devices/sensors a user is using while they are discussing the item within a social tooling application. This allows the user to adapt their personal and business posts to advertise a product, goods, or services, that they want to promote or demote based on the particular situation. Implementations of the invention provide the ability to dynamically distinguish the scope of a user's social media draft message and qualify the message to the data of a related IoT device that is deemed applicable to the message. Implementations of the invention provide a method to convey the correct information from the IoT device for the product, goods, or services to the social media tooling application. Implementations of the invention provide a method to define a sentiment analysis of the social media message to determine if the message will be positive or negative relating to promotion or demotion of a product, good, or service.

There are no current systems or methods that integrate social media postings with dynamically matched IoT device data. Instead, IoT device data is currently only published using rigid conditional rules such as IFTTT. Implementations of the invention provide a technical solution to the technical problem of IoT device data being published only using rigid conditional rules. In embodiments, the technical solution includes an unconventional combination of steps comprising: receiving a draft social media message; dynamically determining IoT device data related to the content of the draft social media message; and generating a suggested social media message that includes both the content of the draft social media message and the dynamically determined IoT device data. Embodiments of the invention provide an improvement in the technology of social media messaging by automatically generating suggested new content for social media messages including IoT device data. Embodiments of the invention utilize techniques that are rooted in computer technology, including IoT devices, natural language processing and semantic analysis.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data infused message generating 96.

Implementations of the invention may include a computer system/server 12 of FIG. 1 in which one or more of the program modules 42 are configured to perform (or cause the computer system/server 12 to perform) one of more functions of the data infused message generating 96 of FIG. 3. For example, the one or more of the program modules 42 may be configured to: receiving a draft social media message; dynamically determining IoT device data related to the content of the draft social media message; and generating a suggested social media message that includes both the content of the draft social media message and the dynamically determined IoT device data.

FIG. 4 shows a block diagram of an exemplary environment in accordance with aspects of the invention. The environment includes a user device 400 connected to a number of IoT devices 402a, 402b, . . . , 402n via a network 404. The user device 400 is a user computer device such as a laptop computer, desktop computer, tablet computer, smartphone, etc., and may comprise one or more components of computer system/server 12 of FIG. 1. In embodiments, the user device 400 stores and runs at least one social media application program 406 that is configured to permit a user of the user device 400 to post/receive messages to/from a social media site, e.g., via an account associated with the user. For example, the at least one social media application program 406 may comprise at least one of a messaging program, a chat program, a social networking program, and a professional networking program that communicates with a social media server 407 to post/receive messages to/from a social media site.

In embodiments, each of the IoT devices 402a-n is a nonstandard (i.e., special purpose) computing device that connects wirelessly to the network 404 and that transmits data. Examples of IoT devices include but are not limited to: a wearable fitness band 402a that includes one or more sensors that collect data such as step count, heartrate, body temperature, location, and time; a smart light 402b that is remotely controllable via the user device 400 and that transmits data as to whether it is on or off; and a smart vehicle 402n that collects data such as speed, acceleration, fuel efficiency (e.g., miles per gallon (mpg)). These examples are not limiting, and the IoT devices 402a-n may include any number "n" and any type of IoT devices.

In embodiments, the IoT devices 402a-n are registered with a user of the user device 400. For example, the user of the user device 400 may perform a setup process with the wearable fitness band 402a such that connects the wearable fitness band 402a to the network 404 and that associates the wearable fitness band 402a with the user (e.g., via a user account or profile). A similar setup process is performed for each one of the IoT devices 402a-n. In this manner, the user can utilize the user device 400 to interact with the IoT devices 402a-n. For example, the user may utilize an application (e.g., an app) on the user device 400 to obtain and view data collected by the sensors of the wearable fitness band 402a. In another example, the user may utilize an application (e.g., an app) on the user device 400 to control (e.g., turn on and off) the smart light 402b. In another example, the user may utilize an application (e.g., an app) on the user device 400 to obtain and view data collected by sensors of the smart vehicle 402n.

In accordance with aspects of the invention, at least one of the IoT devices 402a-n is a private IoT device and at least one of the IoT devices 402a-n is a semi-private IoT device. As used herein, a private IoT device is an IoT device that is registered with and used by a single user. The wearable fitness band 402a is an example of an IoT device that is typically a private IoT device. As used herein, a semi-private IoT device is an IoT device that is used by (or accessible by) a pre-defined group of plural users. For example, the smart light 402b and smart vehicle 402n are examples of IoT devices that are typically used by a pre-defined group of plural users, such as a family. In the case of semi-private IoT devices, each member of the pre-defined group of plural users can obtain and view data of the IoT device that is generated when the IoT device is used by another member of the group of plural users. For example, when a first family member utilizes an application on their user device 400 to turn the smart light 402b off, a second family member may utilize another copy of the same application on their user device (e.g., a device similar to device 400) to see the status of the smart light 402b (e.g., off in this example) and to turn the light on, if desired.

Still referring to FIG. 4, in accordance with aspects of the invention, an IoT device data message server 408 (referred to herein as server 408) communicates with the user device 400 via the network 404. The server 408 is a computer server such as computer system/server 12 of FIG. 1 and includes a message generation module 410 that is configured to perform one or more of the processes described herein. The message generation module 410 may comprise a program module such as program module 42 of FIG. 1. In embodiments, the server 408 may include additional or fewer modules than those shown in FIG. 4. In embodiments, separate modules may be integrated into a single module. Additionally, or alternatively, a single module may be implemented as multiple modules.

In accordance with aspects of the invention, the message generation module 410 has access to the data of each of the IoT devices 402a-n. In one embodiment, the message generation module 410 accesses the data of the IoT devices 402a-n via the user device 400. For example, the application on the user device 400 that is used to obtain and view data collected by the sensors of the wearable fitness band 402a may be configured to provide this same data to the message generation module 410. In another embodiment, the message generation module 410 accesses the data of the IoT devices 402a-n from the devices themselves without going through the user device 400. For example, the user may grant permission for the server 408 to access the data in this direct manner via the application on the user device 400 that is associated with one of the IoT devices 402a-n.

It should be understood that, to the extent implementations of the invention collect, store, or employ personal information provided by individuals (for example, data associated with IoT devices 402a-n), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Still referring to FIG. 2, according to aspects of the invention, the message generation module 410 is configured to utilize data from one or more of the IoT devices 402*a*-*n* to generate a suggested social media message that includes at least a portion of the data from the one or more of the IoT devices 402*a*-*n*. In one embodiment (described herein with respect to FIGS. 5A-B), the message generation module 410 detects that the user has provided an instruction to a particular one of the IoT devices 402*a*-*n* and, based on the detecting, the message generation module 410 automatically generates a suggested social media message that includes data obtained from the particular one of the IoT devices 402*a*-*n*. In another embodiment (described herein with respect to FIGS. 6A-C and 7A-B), the system receives a draft social media message from the user device 400, determines data from one of the IoT devices 402*a*-*n* related to the content of the draft social media message, and generates a revised, suggested social media message that includes the determined data from the one of the IoT devices 402*a*-*n*.

In embodiments, the server 408 stores or has access to an IoT device data classification repository 412 (referred to herein as repository 412) that stores a corpus of classifications of the types of data associated with each of the IoT devices 402*a*-*n*. In embodiments, the classifications are labels (e.g., metadata, tags, words) associated with each respective type of data that the message generation module 410 uses to determine a match between content of a social media message and data of one of the IoT devices 402*a*-*n*. For example, the repository 412 might store the following classifications for the data of the wearable fitness band 402*a*: [data=step count, classification(s)=step, walk, run]; [data=heartrate, classification(s)=exercise, invigorating]; [data=body temperature, classification(s)=hot, cold].

In accordance with aspects of the invention, the message generation module 410 is configured to determine that data from one of the IoT devices 402*a*-*n* is related to content of a draft social media message by comparing the text of the social media message to the classifications stored in the repository 412. Any suitable comparing techniques may be used, such as computer based word matching, natural language processing, etc. For example, the message generation module 410 may perform the comparing by: receiving a draft social media message from the user device 400, analyzing the text of the draft social media message to determine keywords in the draft social media message, and then comparing the determined keywords to the classifications stored in the repository 412 to determine whether data from one of the IoT devices 402*a*-*n* is related to the content of the draft social media message. In another example, the message generation module 410 may perform the comparing by: receiving a draft social media message from the user device 400, analyzing the text of the draft social media message using natural language processing to determine at least one topic of the draft social media message, using linear discriminant analysis or linear regression to correlate each of the at least one topics to the classifications stored in the repository 412, generating a ranked list of the correlations, and selecting the data associated with the highest ranking correlation as data that is related to the draft social media message. Other types of comparing may be used.

In embodiments, the corpus of classifications stored in the repository 412 is initially defined, e.g., by data provided by the respective manufacturers of the IoT devices 402*a*-*n*. In one example, the application (on the user device 400) that is associated with a particular one of the IoT devices 402*a*-*n* includes the classifications for the data associated with the particular IoT device, and the server 408 reads this data from the application and stores it in the repository 412.

In embodiments, the corpus of classifications stored in the repository 412 is updated to refine the classifications to increase the accuracy of matching the content of a draft social media message to data of one of the IoT devices 402*a*-*n*. In one example, the manufacturer of the particular one of the IoT devices 402*a*-*n* provides an update to the application (on the user device 400) that is associated with a particular one of the IoT devices 402*a*-*n*, where the update includes updated classifications, and the server 408 reads the updated classifications from the application and stores them in the repository 412. In another example, the user manually enters data (e.g., via a user interface of the user device 400) to revise the existing classifications and/or define new classifications, and the server 408 updates the classifications stored in the repository 412 based on the user input. In another example, the message generation module 410 receives feedback from the user device 410 based on a user accepting or declining a suggested social media post that was generated by the message generation module 410, and the message generation module 410 revises one or more classifications stored in the repository 412 based on the feedback.

Still referring to FIG. 2, in accordance with aspects of the invention, the message generation module 410 is further configured to determine a sentiment of a draft social media message received from the user device 400. In embodiments, the message generation module 410 uses sentiment analysis to analyze the text of a draft social media message to determine whether the sentiment of the draft social media message is positive or negative. In one implementation, in response to determining a negative sentiment, the message generation module 410 provides an alert to the user device 400 to alert the user of the determined negative sentiment. In another implementation, in response to determining a negative sentiment and also determining that a rule prohibits adding IoT device data to a message with negative sentiment, the message generation module 410 does not generate a suggested social media message based on the draft social media message.

Figure 5A:
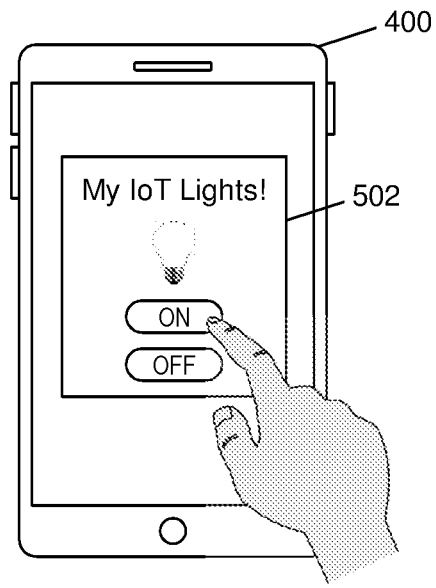
Figure 5B:
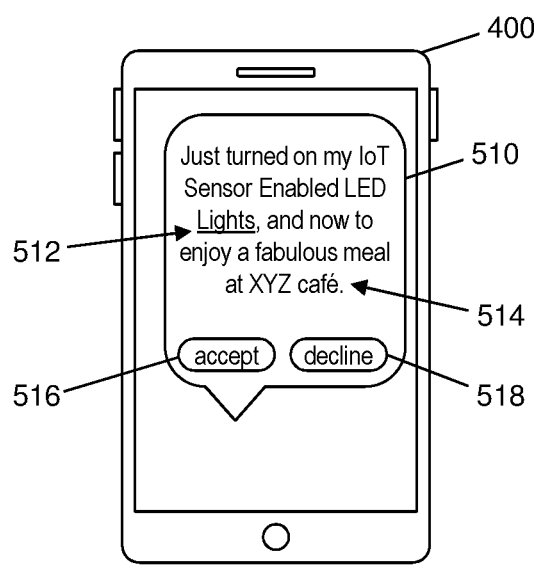

FIGS. 5A and 5B show an exemplary use case in accordance with aspects of the invention. The functions illustrated by the use case may be carried out in the environment of FIG. 4 and are described with reference to elements depicted in FIG. 4. As shown in FIG. 5A, a user of the user device 400 provides input to a user interface 502 of an application that is associated with the IoT device comprising the smart light 402*b*. In this example, the user provides input via the user interface 502 to turn on the smart light 402*b*.

In accordance with aspects of the invention, the message generation module 410 of the server 408 monitors the data that is associated with the smart light 402*b*. In this example, the message generation module 410 uses the network 404 to monitor the data indicating that the smart light 402*b* was turned on by the user. Based on obtaining this data via the monitoring, the message generation module 410 generates a suggested social media message for the user, the suggested social media message including data associated with the smart light bulb 402*b*. As shown in FIG. 5B, the message generation module 410 transmits data to the user device 400 that causes the user device 400 to display the suggested social media message 510 via a user interface of the at least one social media application program 406 that resides on the user device 400.

As shown in FIG. 5B, the suggested social media message 510 includes data about the particular IoT device (e.g., the smart light bulb 402*b*). In this example, the data includes the on/off state of the smart light 402*b* (e.g., "Just turned on . . . "). In embodiments, the message generation module 410 may include an assigned name for the IoT device in the suggested social media message 510 (e.g., " . . . my IOT Sensor Enabled LED Lights").

In embodiments, the message generation module 410 includes a link 512 (e.g., represented by the underlined word "Lights") in the suggested social media message 510, wherein the link is a hyperlink in the social media message that navigates to a website such as a manufacturer website or a third party seller website that provides more information about the particular IoT device (e.g., the smart light bulb 402*b*). In this manner, when the suggested social media message 510 is accepted by the user and posted to the social media website, other users who receive and view the social media message may use the link 512 to navigate to a website to obtain further information about the IoT device that is the subject of the social media message.

In aspects, the message generation module 410 includes additional user information 514 in the suggested social media message 510. In the example shown in FIG. 5B, the additional user information 514 is the name of a location determined from the location based services of the user device 400. Other types of additional user information derived from the user device 400 may also be included.

In accordance with aspects of the invention, the message generation module 410 generates the suggested social media message 510 to include at least one user input feature. In the example shown in FIG. 5B, the at least one user input feature includes a button 516 to accept the suggested social media message 510 and a button 518 to decline the suggested social media message 510. The user pressing the accept button 516 causes the social media application program 406 that resides on the user device 400 to post the suggested social media message 510 to the social media site. The user pressing the decline button 518 deletes the suggested social media message 510 and does not post the suggested social media message 510 to the social media site. In embodiments, the user input received via the at least one user input feature is transmitted to the message generation module 410, which revises its algorithms (i.e., the algorithms that are used to generate suggested social media messages) based on the user input received via the at least one user input feature. In this manner, the message generation module 410 learns from feedback provided by the user when the message generation module 410 generates a suggested social media message 510 for the user, and this learning affects how the message generation module 410 generates future suggested social media messages in similar situations.

Figure 6A:
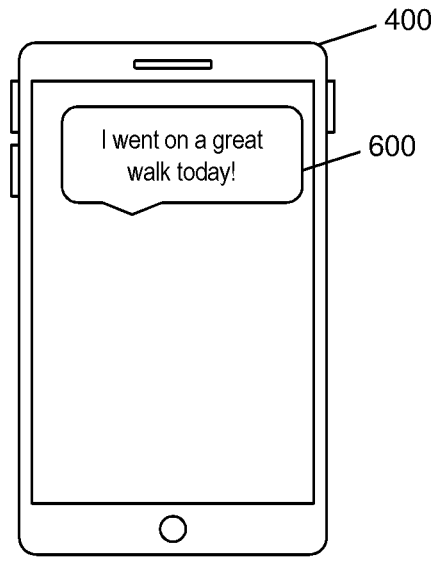
Figure 6B:
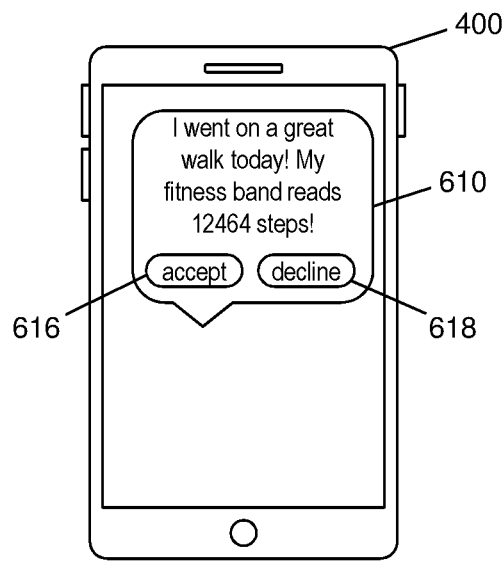
Figure 6C:
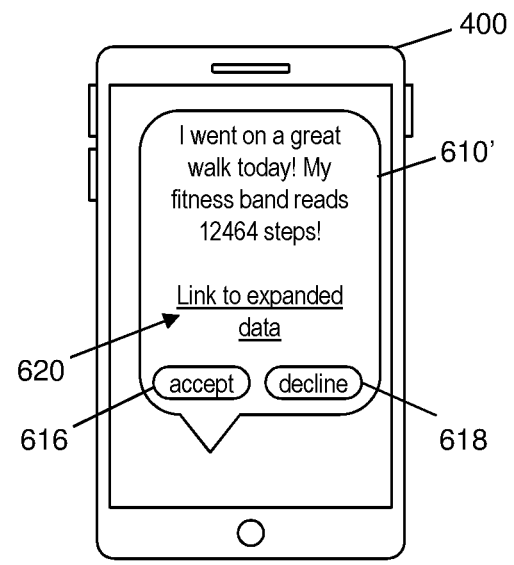

FIGS. 6A, 6B and 6C show an exemplary use case in accordance with aspects of the invention. The functions illustrated by the use case may be carried out in the environment of FIG. 4 and are described with reference to elements depicted in FIG. 4.

As shown in FIG. 6A, a user of the user device 400 generates a draft social media message 600, e.g., using the at least one social media application program 406 that resides on the user device 400. According to aspects of the invention, the user device 400 (e.g., the social media application program 406 running on the user device 400) transmits the draft social media message 600 to the message generation module 410 of the server 408. As described herein, based on receiving the draft social media message 600, the message generation module 410 determines data from one of the IoT devices 402*a-n* that relates to the content of the draft social media message 600. For example, the message generation module 410 may perform this determining by comparing at least one keyword of the text of the draft social media message 600 to the classifications stored in the repository 412. In another example, the message generation module 410 may perform this determining by determining at least one topic of the draft social media message 600, correlating the determined at least one topic to the classifications stored in the repository 412, and selecting the data with the classification that has the highest correlation to the determined at least one topic. In this example, the message generation module 410 determines that the content of the draft social media message 600 relates to the step count data of the wearable fitness band 402*a*.

As shown in FIG. 6B, the message generation module 410 generates a suggested social media message 610 including the determined data and transmits the suggested social media message 610 to the user device 400, which displays the suggested social media message 610 via a user interface of the at least one social media application program 406 that resides on the user device 400. In embodiments, the suggested social media message 610 includes both content from the draft social media message 600 (e.g., "I went on a great walk today") and the determined data (e.g., "12464 steps").

In accordance with aspects of the invention, the message generation module 410 generates the suggested social media message 610 to include at least one user input feature. In the example shown in FIG. 6B, the at least one user input feature includes a button 616 to accept the suggested social media message 610 and a button 618 to decline the suggested social media message 610. The user pressing the accept button 616 causes the social media application program 406 that resides on the user device 400 to post the suggested social media message 610 to the social media site. The user pressing the decline button 618 deletes the suggested social media message 610 and does not post the suggested social media message 610 to the social media site. In embodiments, the user input received via the at least one user input feature is transmitted to the message generation module 410, which revises its algorithms (i.e., the algorithms that are used to generate suggested social media messages) and/or classifications stored in the repository 412 based on the user input received via the at least one user input feature. In this manner, the message generation module 410 learns from feedback provided by the user when the message generation module 410 generates a suggested social media message 610 for the user, and this learning affects how the message generation module 410 generates future suggested social media messages in similar situations.

FIG. 6C shows an embodiment in which the suggested social media message 610' includes a link 620 to more data associated with the particular IoT device. As described herein, a single IoT device may have plural different types of data. For example, the wearable fitness band 402*a* may generate different data including: step count, heartrate, body temperature, location, and time. In embodiments, the message generation module 410 generates the suggested social media message 610 based on a single most correlated one of the types of data, e.g., the step count of the wearable fitness band 402*a* in the example of FIGS. 6A-C. However, it is contemplated that the entire suite of data available from this particular IoT device may be of interest to users viewing the social media message. Accordingly, in embodiments, the message generation module 410 generates the suggested social media message 610' with a link 620 that, when selected by a viewer of the social media message, provides a display of all the types of data for this particular IoT device. In the example shown in FIG. 6C, selecting the link 620 causes the viewing device to display values for all the types of data for the wearable fitness band 402a including: step count, heartrate, body temperature, location, and time.

Figure 7A:
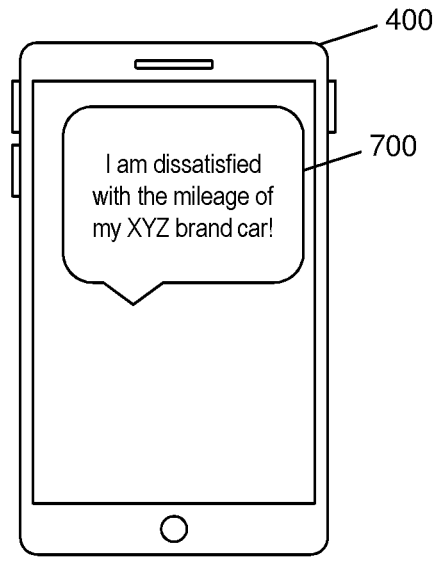
Figure 7B:
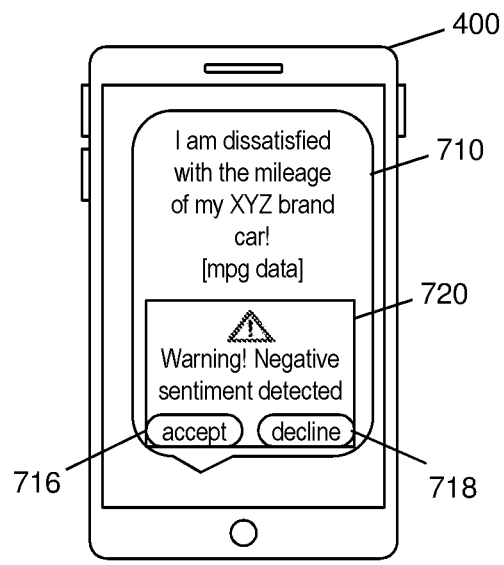

FIGS. 7A and 7B show an exemplary use case in accordance with aspects of the invention. The functions illustrated by the use case may be carried out in the environment of FIG. 4 and are described with reference to elements depicted in FIG. 4.

As shown in FIG. 7A, a user of the user device 400 generates a draft social media message 700, e.g., using the at least one social media application program 406 that resides on the user device 400. According to aspects of the invention, the user device 400 (e.g., the social media application program 406 running on the user device 400) transmits the draft social media message 700 to the message generation module 410 of the server 408. As described herein, based on receiving the draft social media message 700, the message generation module 410 determines data from one of the IoT devices 402a-n that relates to the content of the draft social media message 700. In this example, the message generation module 410 determines that the content of the draft social media message 700 relates to the fuel efficiency data of the smart vehicle 402n.

As shown in FIG. 7B, the message generation module 410 generates a suggested social media message 710 including the determined data and transmits the suggested social media message 710 to the user device 400, which displays the suggested social media message 710 via the at least one social media application program 406 that resides on the user device 400. In embodiments, the suggested social media message 710 includes both content from the draft social media message 700 (e.g., "I am dissatisfied with the mileage of my XYZ brand car!") and the determined data (e.g., represented by "[mpg data]"). In the example shown in FIG. 7B, the suggested social media message 710 includes an the accept button 716 and a decline button 718 that function in the same manner as buttons 616 and 618 previously described with respect to FIG. 6B.

According to further aspects of the invention, the suggested social media message 710 includes an alert 720 that is presented to the user to alert the user of detected negative sentiment of the suggested social media message 710. In embodiments and as described with respect to FIG. 4, the message generation module 410 may be configured to determine a sentiment of the draft social media message 700 and provide an alert to the user in the event that the sentiment is determined to be a negative sentiment. Accordingly, as shown in FIG. 7B, the suggested social media message 710 includes such as an alert 720.

In some embodiments, the repository 412 stores rules with some of the classifications of data. In one embodiment, the rules define situations when the message generation module 410 will not add IoT device data to a draft social media message. An example of one such rule is that the manufacturer of the smart vehicle 402n defines a rule that data from the smart vehicle 402n cannot be suggested for draft social media messages that are determined to have negative sentiment about the smart vehicle 402n. In the example of FIG. 7A, based on such a rule being stored in the repository 412, the message generation module 410 would not generate the suggested social media message 710 shown in FIG. 7B.

FIG. 8 shows a flowchart of an exemplary method in accordance with aspects of the present invention. Steps of the method may be carried out in the environment of FIG. 4 and are described with reference to elements depicted in FIG. 4.

At step 805, the system receives IoT device data. In embodiments, and as described with respect to FIGS. 4 and 5A-B, the message generation module 410 monitors data of IoT devices 402a-n via the network 404. The IoT device may be one of plural IoT devices registered with the user, and the receiving may be based on monitoring data of all the plural IoT devices registered with the user.

At step 810, the system generates and transmits a suggested social media message including the IoT device data obtained at step 805. In embodiments, and as described with respect to FIGS. 4 and 5A-B, the message generation module 410 generates a suggested social media message 510 that is based on and includes data from one of the IoT devices 402a-n. In embodiments, step 810 includes transmitting the suggested social media message 510 to the user device 400 for display via a user interface of the social media application program on the user device 400. The suggested social media message 510 may include a link 512 to a website that provides more information about the IoT device (e.g., a manufacturer of third party seller website). The suggested social media message 510 may include at least one user input (e.g., buttons 516 and 518) that the user can select to provide feedback to the message generation module 410 about the suggested social media message 510.

At step 815, the system receives feedback about the suggested social media message. In embodiments, and as described with respect to FIGS. 4 and 5A-B, the message generation module 410 receives user feedback via the at least one user input (e.g., buttons 516 and 518).

At step 820, the system revises its generating process based on the feedback from step 815. In embodiments, and as described with respect to FIGS. 4 and 5A-B, the message generation module 410 modifies one or more algorithms (e.g., algorithms used in generating the suggested social media messages) based on the feedback.

FIG. 9 shows a flowchart of an exemplary method in accordance with aspects of the present invention. Steps of the method may be carried out in the environment of FIG. 4 and are described with reference to elements depicted in FIG. 4. In embodiments, as described with respect to FIG. 4, the steps of the method can be performed in near real time while the user is creating a draft social media post. For example, the system may perform steps and provide a suggested social media message as the user is typing their draft social media message or within second after the user finishes typing their draft social media message.

At step 905, the system receives a draft social media message. In embodiments, and as described with respect to FIGS. 4, 6A-C, and 7A-B, the message generation module 410 receives a draft social media message 600 or 700 from the user device 400.

At step 910, the system determines IoT device data that matches the draft social media message from step 905. In embodiments, and as described with respect to FIGS. 4, 6A-C, and 7A-B, the message generation module 410 determines the matching data by comparing the content of the draft social media message to stored classifications of data of the IoT devices 402a-n.

At step 915, the system optionally determines a sentiment of the draft social media message from step 905. In embodiments, and as described with respect to FIGS. 4 and 7A-B, the message generation module 410 determines the sentiment by performing sentiment analysis on the text of the draft social media message. In embodiments where the system does not determine sentiment, the method skips step 915 and instead goes from step 910 to step 930 as indicated by the dashed line in FIG. 9.

At step 920, the system determines whether negative sentiment is determined at step 915. In the event that negative sentiment is not determined, the process proceeds to step 930. On the other hand, in the event that negative sentiment is determined, then the process proceeds to step 925.

At step 925, the system determines whether there is a rule against negative sentiment for this IOT device data. In embodiments, and as described with respect to FIGS. 4 and 7A-B, the message generation module 410 determines whether there is a rule associated with the data determined at step 910, the rule defining a prohibition against generating a suggested social media message to include this data when the draft social media message has a determined negative sentiment. In the event there is no such rule, then the process proceeds to step 930. On the other hand, in the event there is such a rule, then the process ends without the message generation module 410 generating a suggested social media message. In this manner, step 925 may comprise determining that the determined negative sentiment satisfies a rule that prohibits generating a suggested social media message that includes the data of the IoT device.

At step 930, the system generates and transmits a suggested social media message based on the data from step 910. In embodiments, and as described with respect to FIGS. 4, 6A-C, and 7A-B, the message generation module 410 generates a suggested social media message that includes both: (i) content from the draft social media message and (ii) IoT device data identified at step 910. In embodiments, step 930 includes transmitting the suggested social media message to the user device 400 for display via a user interface of the social media application program on the user device 400. The suggested social media message may include a link 620 to an expanded set of data associated with the IoT device. The suggested social media message may include at least one user input (e.g., buttons 616/618 or 716/718) that the user can select to provide feedback to the message generation module 410 about the suggested social media message. In embodiments, where negative sentiment is detected, the suggested social media message may include an alert 720 indicating the negative sentiment.

At step 935, the system receives feedback about the suggested social media message. In embodiments, and as described with respect to FIGS. 4, 6A-C, and 7A-B, the message generation module 410 receives user feedback via the at least one user input (e.g., buttons 616/618 or 716/718).

At step 940, the system revises its generating process based on the feedback from step 935. In embodiments, and as described with respect to FIGS. 4, 6A-C, and 7A-B, the message generation module 410 modifies one or more algorithms (e.g., algorithms used in generating the suggested social media messages) and/or classifications stored in the repository based on the feedback.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving, by a computer device and from a user device, a draft social media message;
determining, by the computer device and based on the receiving, data of an Internet of Things (IoT) device that is related to the draft social media message;
generating, by the computer device and based on the determining, a suggested social media message that includes the data of the IoT device; and
transmitting, by the computer device, the suggested social media message to the user device,
wherein the determining comprises: determining content of the draft social media message using natural language processing; and comparing the content of the draft social media message to stored classifications in the form of metadata associated with types of IoT devices,
further comprising determining, by the computer device, a sentiment of the draft social media message by performing sentiment analysis on text of the draft social media message, and performing an action based on the sentiment.

2. The method of claim 1, wherein the suggested social media message includes the draft social media message and the data of the IoT device, the draft social media message having been generated by a user using a social media application program on the user device.

3. The method of claim 1, wherein the data of the IoT device is determined from plural IoT devices registered with a user that drafted the draft social media message.

4. The method of claim 1, wherein the data of the IoT device is one type of data from a set of plural types of data of the IoT device.

5. The method of claim 4, wherein the suggested social media message includes a link to display other ones of the plural types of data of the IoT device.

6. The method of claim 1, wherein the determining the content of the draft social media message comprises determining key words of the draft social media message by analyzing text of the draft social media message using natural language processing, and the comparing comprises comparing the key words of the draft social media message to the stored classifications.

7. The method of claim 1, wherein determining the content of the draft social media message comprises determining a topic of the draft social media message by analyzing text of the draft social media message using natural language processing, and the comparing comprises comparing the determined topic to the stored classifications.

8. The method of claim 1, wherein the suggested social media message includes at least one user input to provide feedback to the computer device, the at least one user input comprising:
a first object to accept the suggested social media message, wherein user input selecting the first object causes a social media application program to post the suggested social media message to a social media site; and
a second object to decline the suggested social media message, wherein user input selecting the second object deletes the suggested social media message without posting the suggested social media message to the social media site.

9. The method of claim 8, further comprising:
receiving, by the computer device, feedback via the at least one user input; and
revising one or more of the stored classifications based on the feedback.

10. The method of claim 1, wherein:
the sentiment is determined to be a negative sentiment, and the performing the action based on the sentiment comprises providing, by the computer device, an alert of the negative sentiment in the suggested social media message.

11. A computer program product, the computer program product comprising a computer readable storage medium having program instructions embodied therewith, the program instructions executable by a computing device to cause the computer device to:
receiving a draft social media message from a user device;
determine data of an Internet of Things (IoT) device that is related to the draft social media message;
determining a sentiment of the draft social media message by performing sentiment analysis on text of the draft social media message;
determine the sentiment of the message is a negative sentiment; and
based on the determining the negative sentiment, perform one of:
generate and transmit to the user device a suggested social media message that includes both the data of the IoT device and an alert of the negative sentiment; and
determine that the negative sentiment satisfies a rule that prohibits generating a suggested social media message that includes the data of the IoT device.

12. The computer program product of claim 11, wherein the generated and transmitted suggested social media message includes the draft social media message.

13. The computer program product of claim 12, wherein the suggested social media message includes a link to display other data of the IoT device.

14. The computer program product of claim 12, wherein the determining data of the IoT device comprises comparing content of the draft social media message to stored classifications of data of plural IoT devices.

15. The computer program product of claim 12, wherein the suggested social media message includes at least one user input to provide feedback to the computer device.

16. A system comprising:
a processor, a computer readable memory, and a computer readable storage medium;
program instructions to receive data from an Internet of Things (IoT) device that is registered with a user;
program instructions to generate a suggested social media message using an algorithm, wherein the suggested social media message includes the data from the IoT device;
program instructions to transmit the suggested social media message to a user device for display via a user interface of a social media application; and
program instructions to revise the algorithm based on user feedback associated with the suggested social media message,
wherein the suggested social media message includes:
a first object to accept the suggested social media message, wherein user input selecting the first object causes the social media application to post the suggested social media message to a social media site; and
a second object to decline the suggested social media message, wherein user input selecting the second object deletes the suggested social media message without posting the suggested social media message to the social media site, and
wherein the program instructions are stored on the computer readable storage medium for execution by the processor via the computer readable memory.

17. The system of claim 16, wherein:
the IoT device is one of plural IoT devices registered with the user; and
the receiving is based on monitoring data of all the plural IoT devices registered with the user.

18. The system of claim 16, wherein the suggested social media message includes at least one user input to provide the user feedback.

* * * * *